(12) United States Patent
Gartside et al.

(10) Patent No.: US 7,810,091 B2
(45) Date of Patent: Oct. 5, 2010

(54) MECHANISM TO CHECK THE MALICIOUS ALTERATION OF MALWARE SCANNER

(75) Inventors: Paul Nicholas Gartside, Milton Keynes (GB); Mark Harris, Banbury (GB)

(73) Assignee: McAfee, Inc., Santa Clara, CA (US)

( * ) Notice: Subject to any disclaimer, the term of this patent is extended or adjusted under 35 U.S.C. 154(b) by 349 days.

(21) Appl. No.: 10/115,039

(22) Filed: Apr. 4, 2002

(65) Prior Publication Data

US 2003/0192033 A1 Oct. 9, 2003

(51) Int. Cl.
*G06F 9/445* (2006.01)
*G06F 15/16* (2006.01)
*G06F 11/00* (2006.01)
*H04L 29/06* (2006.01)
*H04L 9/32* (2006.01)
*H04L 21/00* (2006.01)

(52) U.S. Cl. .................. 717/177; 717/175; 717/176; 717/178; 713/161; 713/168; 713/170; 713/188; 709/203; 709/225; 726/24

(58) Field of Classification Search .......... 717/168–178; 714/38, 39; 707/201, 232; 713/200; 726/22
See application file for complete search history.

(56) References Cited

U.S. PATENT DOCUMENTS

| 5,649,095 | A | * | 7/1997 | Cozza | 714/39 |
|---|---|---|---|---|---|
| 5,793,982 | A | * | 8/1998 | Shrader et al. | 709/232 |
| 5,822,517 | A | * | 10/1998 | Dotan | 713/200 |
| 5,956,403 | A | * | 9/1999 | Lipner et al. | 713/181 |
| 6,035,423 | A | * | 3/2000 | Hodges et al. | 714/38 |
| 6,049,671 | A | * | 4/2000 | Slivka et al. | 717/173 |
| 6,049,872 | A | * | 4/2000 | Reiter et al. | 713/157 |
| 6,075,943 | A | * | 6/2000 | Feinman | 717/175 |
| 6,178,551 | B1 | * | 1/2001 | Sana et al. | 717/140 |
| 6,499,109 | B1 | * | 12/2002 | Balasubramaniam et al. | 713/201 |
| 6,609,196 | B1 | * | 8/2003 | Dickinson et al. | 713/154 |
| 6,675,382 | B1 | * | 1/2004 | Foster | 717/177 |
| 7,536,686 | B2 | * | 5/2009 | Tan et al. | 717/174 |
| 2003/0046679 | A1 | * | 3/2003 | Singleton | 717/175 |
| 2003/0051235 | A1 | * | 3/2003 | Simpson | 717/174 |
| 2003/0074574 | A1 | * | 4/2003 | Hursey et al. | 713/200 |
| 2003/0192033 | A1 | * | 10/2003 | Gartside et al. | 717/126 |
| 2004/0015957 | A1 | * | 1/2004 | Zara et al. | 717/174 |
| 2004/0236884 | A1 | * | 11/2004 | Beetz | 710/68 |

* cited by examiner

*Primary Examiner*—Lewis A Bullock, Jr.
*Assistant Examiner*—Isaac T Tecklu
(74) *Attorney, Agent, or Firm*—Zilka-Kotab, PC

(57) ABSTRACT

The installation of a computer program, such as a malware scanner, may be checked to determine whether or not it has not been tampered with using an installation checking computer program to gather characteristics of the installation of the target computer program after the installation checking computer program has first been validated by a separate further computer. The installation characteristics may include operating system registry entries, installed files list, file sizes and file checksums.

25 Claims, 6 Drawing Sheets

MECHANISM TO CHECK THE MALICIOUS ALTERATION OF MALWARE SCANNER

BACKGROUND OF THE INVENTION

1. Field of the Invention

This invention relates to the field of data processing systems. More particularly, this invention relates to the validation of the installation of a computer program on a computer.

2. Background of the Invention

It is known to provide computer programs, such as malware scanners, that serve to protect a computer from various security threats, such as computer viruses, worms, Trojans, etc. A problem with such malware scanners is that for various reasons, such as maintenance or diagnostics, they may be temporarily disabled and in this state may themselves be subject to malicious alteration by malware. Furthermore, as new types of malware are released into the wild, some of these may be capable of maliciously altering the malware scanner even whilst it is enabled until the malware scanner is updated to include appropriate counter-measures. If the malware scanner itself becomes infected with malware, this can be a significant problem as the malware scanner typically has high level access within the system and may be capable of spreading a malware infection widely throughout an entire computer system. For this reason, it is strongly desirable to have a mechanism which counters the malicious alteration of a malware scanner.

It is known to provide a malware scanner that checks its own executable file for modification before it runs. However, such protection relies upon the executable file only being modified rather than replaced and is vulnerable to various types of malware attack.

Measures which can enhance security against the malicious alteration of an installed computer program are strongly desirable.

SUMMARY OF THE INVENTION

Viewed from one aspect the present invention provides a computer program product for validating an installation of a target computer program on a target computer, said computer program product comprising:

installation checking code validated with a further computer connected by a network link to said target computer and operable to execute upon said target computer to gather characteristics of said installation of said target computer program upon said target computer;

comparing code operable to comparing said gathered characteristics with predetermined valid characteristics;

response code operable if said gathered characteristics match said predetermined valid characteristics to trigger an installation valid response and operable if said gathered characteristics do not match said predetermined valid characteristics to trigger an installation invalid response.

The invention recognises that an increased degree of security may be achieved by providing an installation checking mechanism that gathers installation characteristics and compares these with known valid installation characteristics. It is likely that a malicious alteration to an installed computer program will change these characteristics in order that a match will no longer be achieved with known valid characteristics and accordingly an appropriate invalid installation response triggered, such as issuing a warning, disabling the computer program which has been tampered with etc. Furthermore, the installation checking mechanism is itself validated using a further computer connected by a network link to the target computer. The further computer can be provided with a high level of security and tamper resistance that would not be appropriate on the target computer and yet the target computer can benefit from this since the further computer will validate the installation checking mechanism to resist attempts to circumvent this installation checking protection.

One preferred technique for validating the installation checking code is to store this code on the further computer and transfer the code to the target computer for execution on the target computer as it is required. Execution at the target computer has the advantage that the installation checking code has direct access to the characteristics which it is seeking to check making it more difficult for these to be masked or spoofed.

A further preferred technique for validating the installation checking code is to have this installed upon the target computer but validated by exchange of a secure key with the further computer prior to use.

The validation technique for the target computer program could be initiated in various different ways. One preferred technique is to require user input to trigger the check, such as user input when the user observes unusual or in appropriate behaviour of the target computer program and suspects that it may have been subject to tampering.

A further preferred technique for initiating the installation checking is to have this triggered whenever the target computer connects to a network. A particularly convenient way of doing this is to use the login script for the target computer to start execution of the installation checking code.

It will be appreciated that the characteristics of the installation of the target computer program that are gathered could take a wide variety of different forms. However, particularly preferred characteristics are operating system registry entries for the target computer program, lists of files stored in the program file directory of the target computer program and file sizes and checksums (e.g. MD5 checksums) associated with the files of the target computer program.

Whilst the technique of validating the installation of a computer program to check it for tampering may be applied to a wide variety of different types of computer program, it is particularly applicable to the protection of malware scanners. Malware scanners check for malicious alteration of other computer files, but may themselves be subject to malicious alteration and find it difficult to check themselves. Accordingly, this present technique enables a degree of security to be achieved for the malware scanner itself.

Malware scanners typically scan to detect one or more of computer viruses, worms, Trojans, banned files, banned words, banned images etc.

The predetermined characteristics of the installation may be coded into the installation checking code with appropriate algorithms. Alternatively, an increased degree of flexibility and improved security may be achieved when the predetermined characteristics are themselves stored on the further computer which is used to validate the installation checking code. In some preferred embodiments the predetermined characteristics may be individual to a particular computer, for example, using the MAC address of the computer to uniquely identify the computer and index the storage of individual installation characteristics for the target computer program for that computer.

Other aspects of the present invention provide a method for validating installation of a target computer program and an apparatus for validating installation of a target computer program.

The above, and other objects, features and advantages of this invention will be apparent from the following detailed description of illustrative embodiments which is to be read in connection with the accompanying drawings.

DETAILED DESCRIPTION

Figure 1:
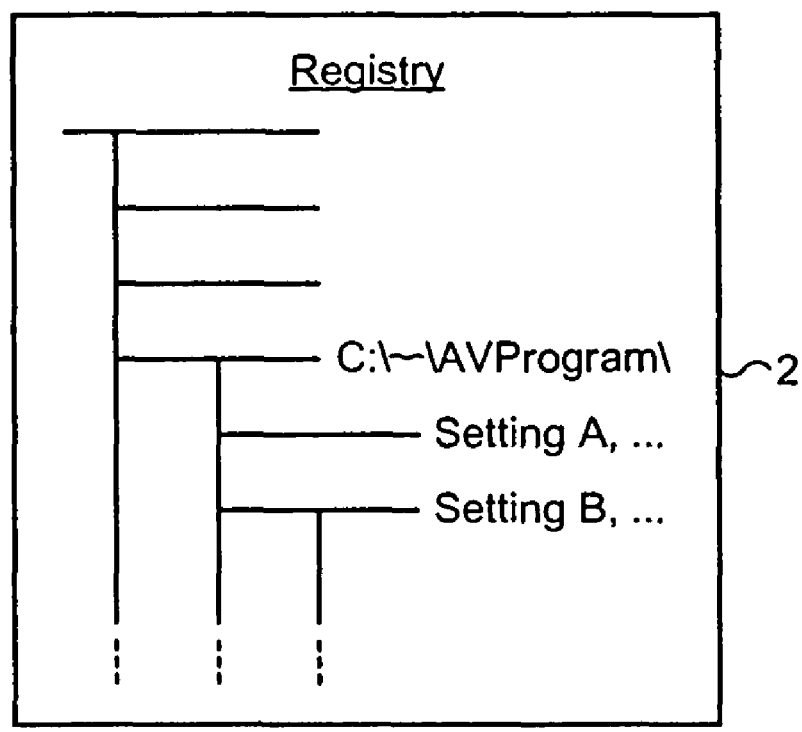
FIG. 1 schematically illustrates characteristics of the installation of a malware scanner.
Figure 1:
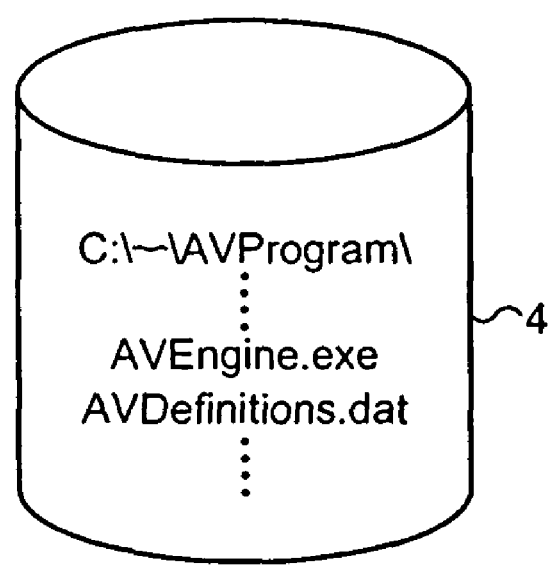

FIG. 1 illustrates installation characteristics of a target computer program labeled "AV". More particularly, the operating system registry 2 will contain within it settings and parameters specific to the target computer program in question. These registry settings may for example include the paths to executable files, the version identifiers of the files concerned, e.g. for a malware scanner the scanner engine and malware definition data versions, as well as other parameters associated with the installation of the target computer program.

The non-volatile storage such as disk storage 4 where the computer program files associated with the target computer program are stored will have installation characteristics such as a specific collection of files stored within a subdirectory associated with the target computer program. This set of computer files will itself be a characteristic of the installation and a further characteristic may be the individual sizes of those files, or at least critical ones of those files that are normally invariant, or checksums (e.g. MD5 checksums) calculated from one or more of the computer files associated with the target computer program.

Figure 2:
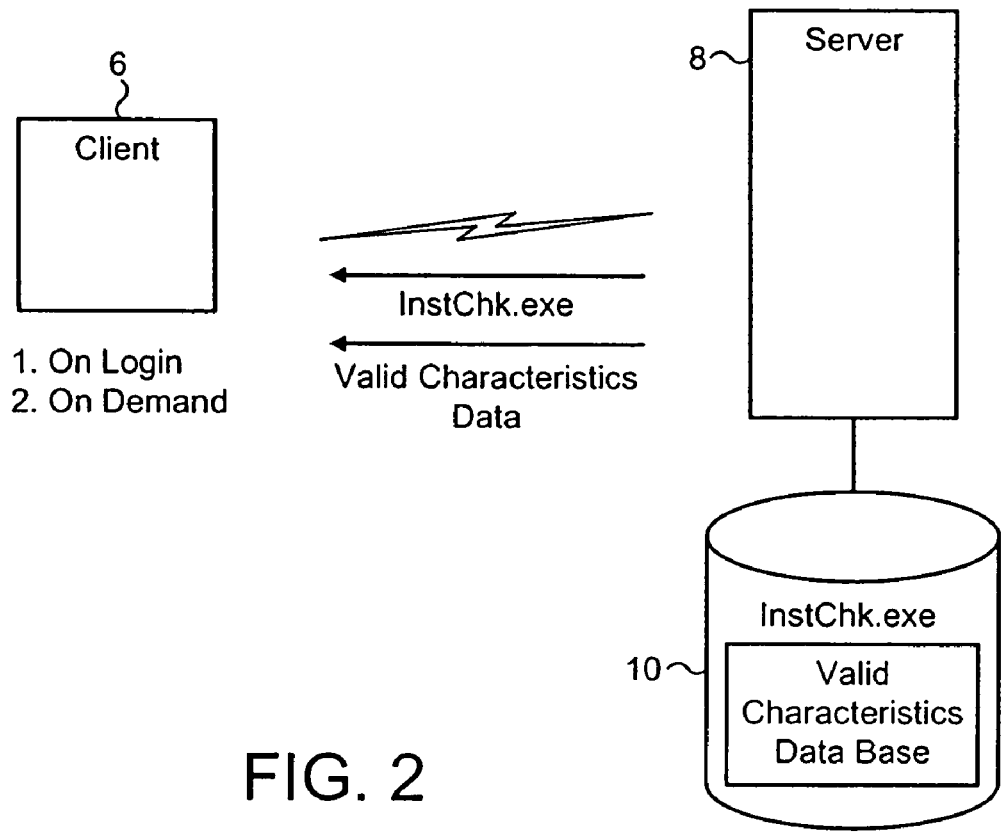
FIG. 2 schematically illustrates one mechanism for installation checking using two different trigger techniques.

FIG. 2 illustrates a first technique for checking installation of a target computer program. A client computer 6 is connected via a network link to a server computer 8. The installation checking may be triggered by the network login of the client computer 6 to the server computer 8. This login initiates execution of a login script which specifies an installation checking computer program to be executed upon the client computer 6. Alternatively, a user may trigger an on-demand check of the installation if they notice suspicious behaviour of their computer or the target computer program in particular, or as a regular, possibly scheduled, event.

As illustrated in FIG. 2 the installation checking computer program is stored by the server computer 8 on the server computer's storage medium 10. This known valid installation checking computer program is transferred from the server computer 8 to the client computer 6 and then executes on the client computer 6 to gather installation characteristics of the target computer program in question. The server computer 8 also stores a database of valid characteristics that may be associated with the installation of the target computer program. In some embodiments these may be specific to individual client computers (having been previously gathered when the target computer program was in a known clean state) and may be referenced by their MAC address or some unique identifier. Other embodiments may have a collection of known valid characteristics for the particular network concerned as set up by a system administrator or the like. These valid installation characteristics are transferred from the server computer 8 to the client computer 6 and are used by the installation checking computer program to compare with the just gathered characteristics to trigger either an installation valid or an installation invalid response. The installation valid response may be to simply proceed with the login and allow the target computer program to execute as required. The installation invalid response could disable the target computer program and issue an appropriate alert message to the user or system administrator.

Figure 3:
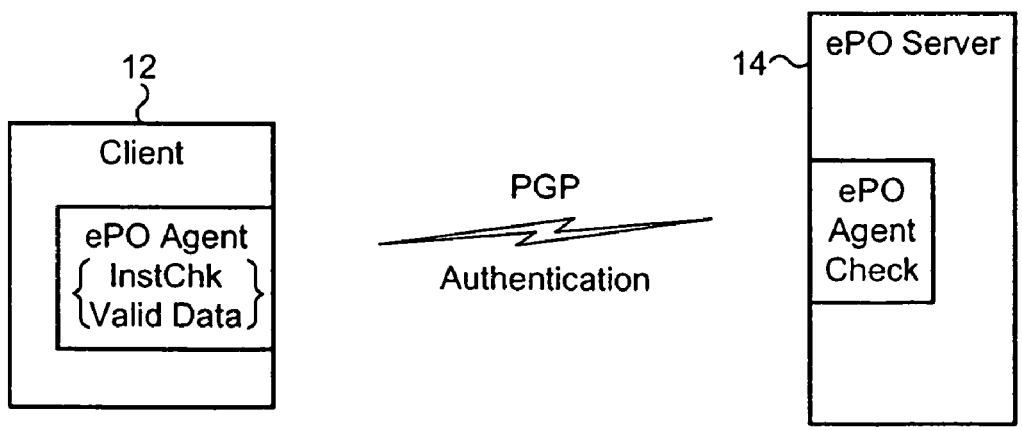
FIG. 3 illustrates a further technique for installation checking.

FIG. 3 illustrates a further embodiment in which a client computer 12 is connected via a network link to a server computer 14 that is running a security management program such as ePolicyOrchestrator produced by Network Associates, Inc. In this arrangement the client computer 12 normally runs an agent computer program which is responsible for reporting configuration information of the client computer 12 to the server computer 14. This communication between the client computer 12 and the server computer 14 is secured by the exchange of secure keys, such as PGP keys. Having established this secure link, the server 14 may validate the agent computer program on the client computer to ensure that it has not been subject to tampering. Thus, the agent computer program may as part of its functionality provide the installation checking of one or more target computer programs using valid characteristic data held at the client computer 12. The server computer 14 may periodically trigger the agent computer program to perform such installation checking or may alternatively utilise the login of the client computer 12 or an on-demand user initiated event to trigger the installation checking of the target computer program.

Figure 4:
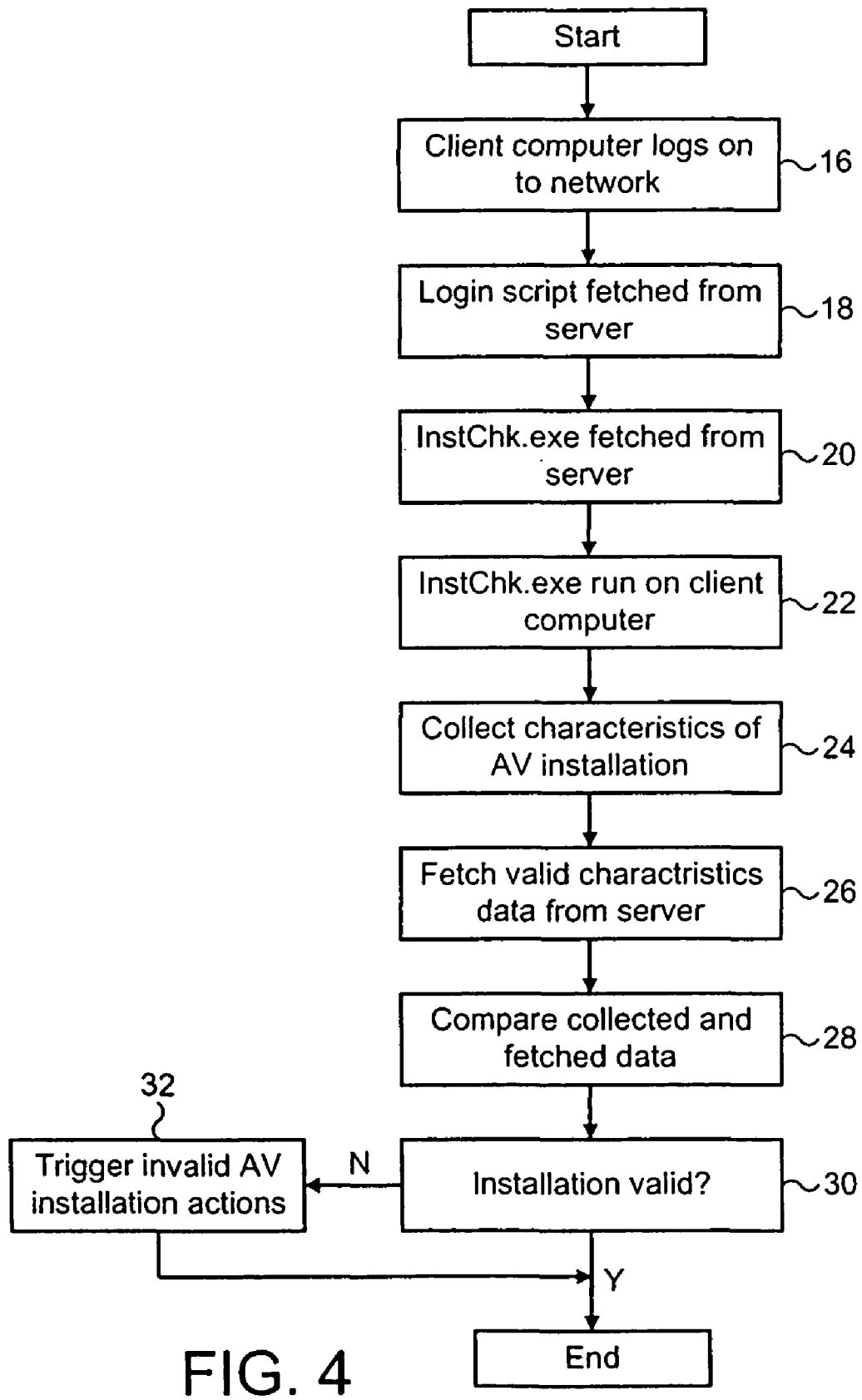
FIG. 4 is a flow diagram schematically illustrating the processing to validate an installation in accordance with a first example embodiment.

FIG. 4 is a flow diagram schematically illustrating the processing performed to check the installation of a target computer program. At step 16 a client computer logs on to a network. At step 18 the login script for the client computer is fetched from the server and executed by the client computer. At step 20 a portion of the login script specifies that an installation checking computer program should be fetched from the server computer. At step 22 this installation checking computer program is run on the client computer. At step 24 the installation checking computer program gathers characteristics of a malware scanning computer program installed on the client computer. These characteristics indicate how the malware scanner is installed and provide an indication if that installation has been altered. The execution of the installation checking computer program upon the client computer itself allows it to directly gather these installation characteristics in a manner which makes these characteristics more difficult to mask or spoof. The installation characteristics gathered may include those illustrated in connection with FIG. 1 as well as further characteristics as desired. The malware scanner may typically provide the functionality of scanning for one or more of computer viruses, worms, Trojans, banned files, banned words, banned images etc.

At step 26 a set of predetermined valid characteristics are fetched from the server to the client computer. At step 28 these predetermined valid installation characteristics are compared with the gathered characteristics collected at step 24. Step 30 determines whether the collected installation characteristics and the predetermined valid installation characteristics match. If there is a match, then the installation is determined not to have been tampered with and the processing terminates. If the characteristics do not match, then step 32 triggers an invalid installation series of actions, such as disabling the malware scanner, issuing user and system administrator alerts, reinstalling a known clean copy of the malware scanner etc.

Figure 5:
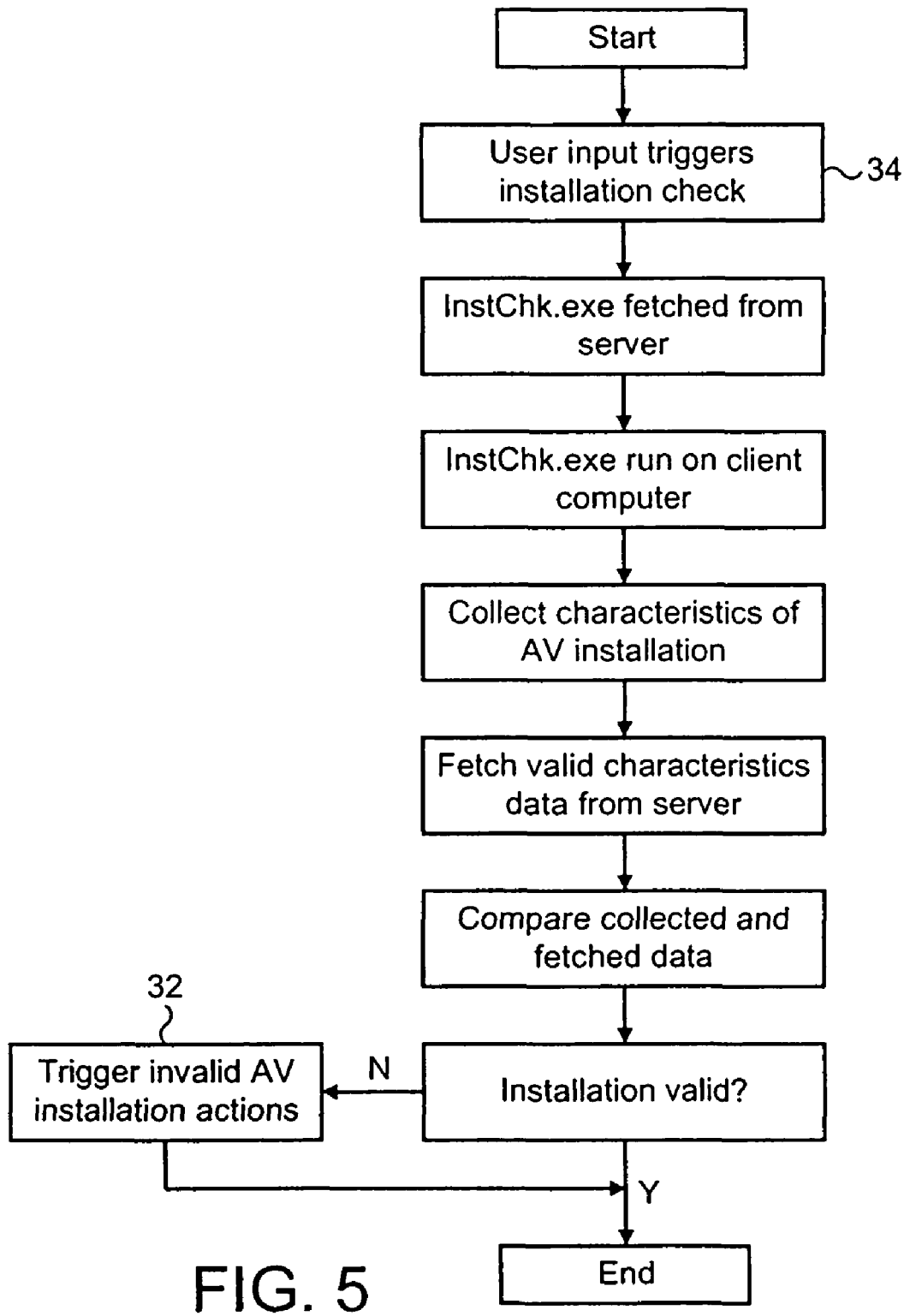
FIG. 5 is a flow diagram schematically illustrating the processing to validate an installation in accordance with a second example embodiment.

FIG. 5 is a flow diagram illustrating an alternative embodiment. This embodiment shares the majority of the processing steps of the process illustrated in FIG. 4 but is triggered in a different way. More particularly, step 34 serves to trigger the installation checking of the target computer program in response to a user input. This may be a purely manual user input or a scheduled event. The remaining processing in FIG. 5 follows that of FIG. 4.

Figure 6:
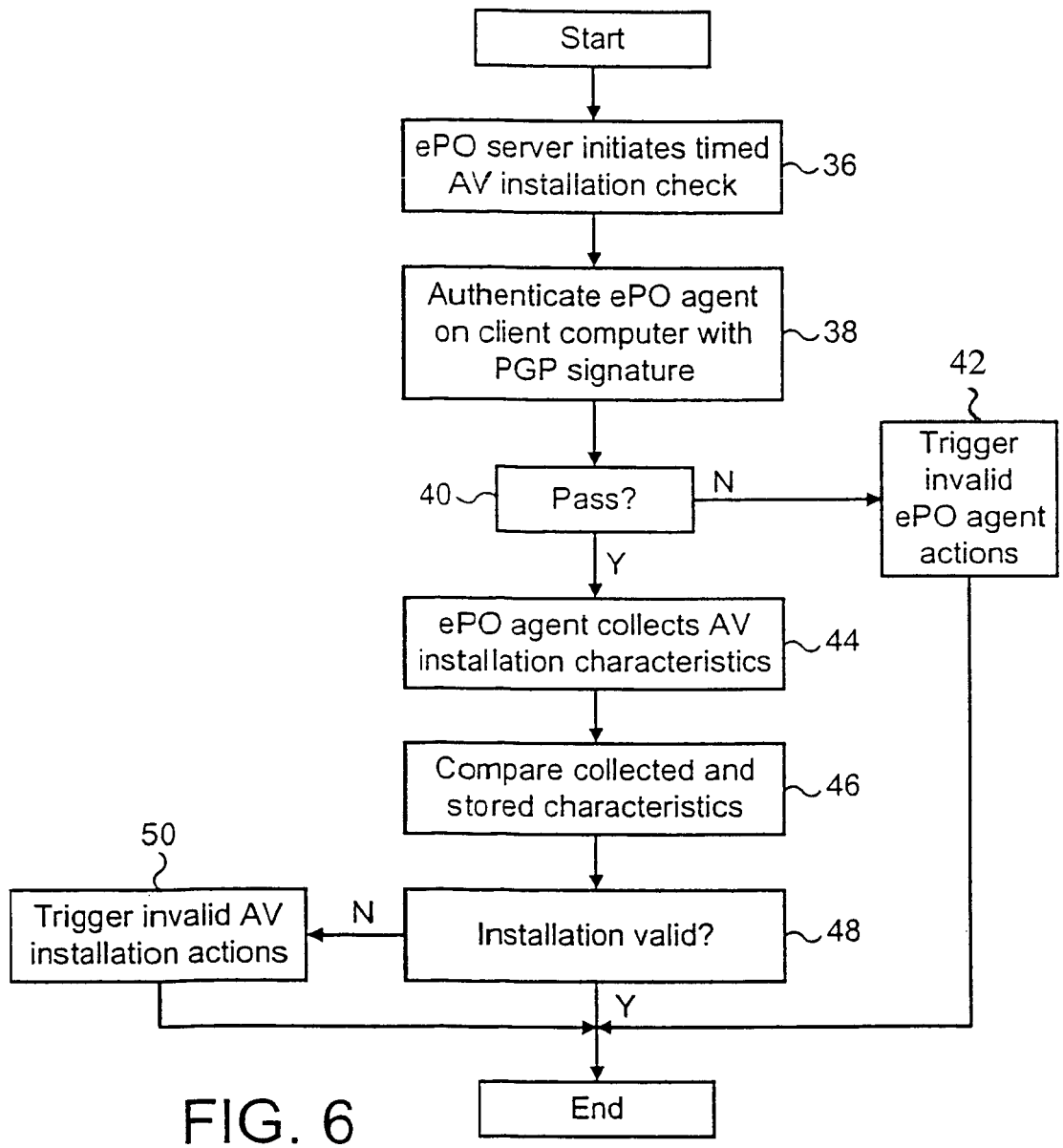
FIG. 6 is a flow diagram schematically illustrating the processing to validate an installation in accordance with a third example embodiment.

FIG. 6 is a flow diagram schematically illustrating processing in accordance with a third embodiment corresponding to the system discussed in relation to FIG. 3. At step 36 the security managing server initiates a timed installation check upon the malware scanner. As an alternative, such an installation check could be triggered when the client computer in question logged onto the network.

At step 38 the agent computer program on the client computer is authenticated using a PGP signature associated with that agent computer program. Step 40 determines whether this authentication is passed. If the authentication is not passed, then step 42 triggers an invalid agent response, which may for example include refusing the client computer access to the network and issuing a user and/or administrator warning messages. If the authentication is passed, then processing proceeds to step 44 where the agent computer program serves to execute installation checking code as part of its own agent main routine. This installation checking code collects/gathers characteristics of the malware scanner installation on the client computer. At step 46 these gathered characteristics are compared with predetermined valid characteristics stored by the agent computer program. Step 48 responds to the comparison indicating that they do not match by triggering an invalid installation response at step 50, such as disabling the malware scanner, issuing appropriate alert messages to a user or administrator, installing a clean copy of the malware scanner etc. If the characteristics gathered and the predetermined valid characteristics do match, then step 48 will merely terminate the installation check as its valid installation response.

Figure 7:
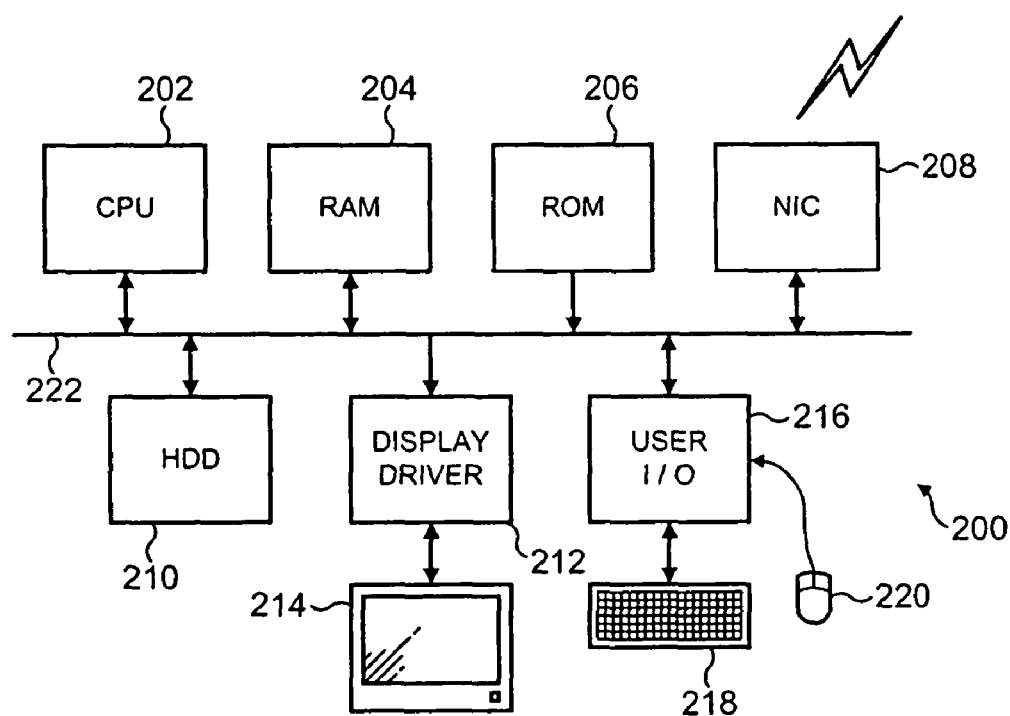
FIG. 7 schematically illustrates the architecture of a general purpose computer that may be used to implement the above described techniques.

FIG. 7 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 7 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product embodied on a computer-readable physical storage medium, said computer program product comprising:

installation checking code validated with a further computer connected by a network link to a target computer and operable to execute upon said target computer to gather characteristics of an installation of a target computer program upon said target computer;

comparing code operable to compare said gathered characteristics with predetermined valid characteristics, said predetermined valid characteristics being set up by an administrator as common valid characteristics for a plurality of computers of a network including said target computer;

response code operable if said gathered characteristics match said predetermined valid characteristics to trigger an installation valid response and operable if said gathered characteristics do not match said predetermined valid characteristics to trigger an installation invalid response;

wherein said computer program product is operable such that said characteristics of said installation include:

operating system registry entries for said target computer program;

a list of files stored in a program file directory of said target computer program;

one or more file size values associated with one or more files of said target computer program; and one or more checksum values associated with one or more files of said target computer program;

wherein said target computer program is a malware scanning computer program;

wherein said computer program product is operable such that validation of said installation is triggered when said target computer connects to the network;

wherein said computer program product is operable such that an agent computer program that executes said installation checking code is installed on said target computer and is authenticated using a Pretty Good Privacy (PGP) signature associated with said agent computer program after said agent computer program is installed on said target computer;

wherein said computer program product is operable such that, if said authentication of said agent computer program is not passed, said target computer is refused access to said network, and a warning message is issued;

wherein said computer program product is operable such that, if said authentication of said agent computer program is passed, said installation checking code is executed by said agent computer program as part of its own agent main routine.

2. A computer program product as claimed in claim 1, wherein said installation checking code is validated by being securely stored on said further computer and transferred from said further computer to said target computer before being executed on said target computer.

3. A computer program product as claimed in claim 1, wherein said installation checking code is validated by sending a secure key to said further computer.

4. A computer program product as claimed in claim 1, wherein validation of said installation is also triggered by a user input.

5. A computer program product as claimed in claim 1, wherein a login script for said target computer starts execution of said installation checking computer code.

6. A computer program product as claimed in claim 1, wherein said malware scanning computer program scans for one or more of:
   computer viruses;
   worms;
   Trojans;
   banned files;
   banned words; and
   banned images.

7. A computer program product as claimed in claim 1, wherein said predetermined valid characteristics are stored on said further computer.

8. A computer program product as claimed in claim 1, wherein said installation invalid response disables said target computer program and issues an alert message.

9. A computer program product as claimed in claim 1, wherein said installation invalid response installs a clean copy of said malware scanning computer program.

10. A computer program product as claimed in claim 4, wherein said user input includes a scheduled event.

11. A computer program product as claimed in claim 1, wherein said installation checking code is transferred from said further computer to said target computer for execution on said target computer.

12. A method, said method comprising the steps of:
   validating security of an installation checking computer program with a further computer connected by a network link to a target computer;
   executing said installation checking computer program upon said target computer to gather characteristics of an installation of a target computer program upon said target computer;
   comparing said gathered characteristics with predetermined valid characteristics, said predetermined valid characteristics being set up by an administrator as common valid characteristics for a plurality of computers of a network including said target computer;
   if said gathered characteristics match said predetermined valid characteristics, then triggering an installation valid response; and
   if said gathered characteristics do not match said predetermined valid characteristics, then triggering an installation invalid response;
   wherein said characteristics of said installation include:
      operating system registry entries for said target computer program;
      a list of files stored in a program file directory of said target computer program;
      one or more file size values associated with one or more files of said target computer program; and
      one or more checksum values associated with one or more files of said target computer program;
   wherein said target computer program is a malware scanning computer program;
   wherein validation of said installation is triggered when said target computer connects to the network;
   wherein said installation checking computer program is installed on said target computer and is authenticated using a Pretty Good Privacy (PGP) signature associated with said installation checking computer program after said installation checking computer program is installed on said target computer;
   wherein, if said authentication of said installation checking computer program is not passed, said target computer is refused access to said network, and a warning message is issued;
   wherein, if said authentication of said installation checking computer program is passed, installation checking code is executed by said installation checking computer program as part of its own agent main routine.

13. A method as claimed in claim 12, wherein said installation checking computer program is validated by being securely stored on said further computer and transferred from said further computer to said target computer before being executed on said target computer.

14. A method as claimed in claim 12, wherein said installation checking computer program is validated by sending a secure key to said further computer.

15. A method as claimed in claim 12, wherein validation of said installation is also triggered by a user input.

16. A method as claimed in claim 12, wherein a login script for said target computer starts execution of said installation checking.

17. A method as claimed in claim 12, wherein said malware scanning computer program scans for one or more of:
   computer viruses;
   worms;
   Trojans;
   banned files;
   banned words; and
   banned images.

18. A method as claimed in claim 12, wherein said predetermined valid characteristics are stored on said further computer.

19. Apparatus embodied on a computer-readable physical storage medium, said apparatus comprising:
   installation checking logic validated with a further computer connected by a network link to a target computer and operable to execute upon said target computer to gather characteristics of an installation of a target computer program upon said target computer;
   comparing logic operable to compare said gathered characteristics with predetermined valid characteristics, said predetermined valid characteristics being set up by an administrator as common valid characteristics for a plurality of computers of a network including said target computer;
   response logic operable if said gathered characteristics match said predetermined valid characteristics to trigger an installation valid response and operable if said gathered characteristics do not match said predetermined valid characteristics to trigger an installation invalid response;
   wherein said apparatus is operable such that said characteristics of said installation include:
      operating system registry entries for said target computer program;

a list of files stored in a program file directory of said target computer program;

one or more file size values associated with one or more files of said target computer program; and one or more checksum values associated with one or more files of said target computer program;

wherein said target computer program is a malware scanning computer program;

wherein said apparatus is operable such that validation of said installation is triggered when said target computer connects to the network;

wherein said apparatus is operable such that an agent computer program that executes said installation checking logic is installed on said target computer and is authenticated using a Pretty Good Privacy (PGP) signature associated with said agent computer program after said agent computer program is installed on said target computer;

wherein said apparatus is operable such that, if said authentication of said agent computer program is not passed, said target computer is refused access to said network, and a warning message is issued;

wherein said apparatus is operable such that, if said authentication of said agent computer program is passed, said installation checking logic is executed by said agent computer program as part of its own agent main routine.

20. Apparatus as claimed in claim 19, wherein said installation checking logic is validated by being securely stored on said further computer and transferred from said further computer to said target computer before being executed on said target computer.

21. Apparatus as claimed in claim 19, wherein said installation checking logic is validated by sending a secure key to said further computer.

22. Apparatus as claimed in claim 19, wherein validation of said installation is also triggered by a user input.

23. Apparatus as claimed in claim 19, wherein a login script for said target computer starts execution of said installation checking logic.

24. Apparatus as claimed in claim 19, wherein said malware scanning computer program scans for one or more of:
    computer viruses;
    worms;
    Trojans;
    banned files;
    banned words; and
    banned images.

25. Apparatus as claimed in claim 19, wherein said predetermined valid characteristics are stored on said further computer.

* * * * *